US012199370B2

(12) United States Patent
Nakajima

(10) Patent No.: US 12,199,370 B2
(45) Date of Patent: Jan. 14, 2025

(54) CONNECTOR AND ELECTRONIC DEVICE

(71) Applicant: KYOCERA CORPORATION, Kyoto (JP)

(72) Inventor: Nobuyuki Nakajima, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 409 days.

(21) Appl. No.: 17/637,267

(22) PCT Filed: Aug. 5, 2020

(86) PCT No.: PCT/JP2020/030084

§ 371 (c)(1),
(2) Date: Feb. 22, 2022

(87) PCT Pub. No.: WO2021/039333

PCT Pub. Date: Mar. 4, 2021

(65) Prior Publication Data

US 2022/0285867 A1 Sep. 8, 2022

(30) Foreign Application Priority Data

Aug. 23, 2019 (JP) ................................ 2019-152912

(51) Int. Cl.
*H01R 13/639* (2006.01)
*H01R 12/77* (2011.01)
(Continued)

(52) U.S. Cl.
CPC ........... *H01R 12/774* (2013.01); *H01R 12/79* (2013.01); *H01R 13/6275* (2013.01); *H01R 13/631* (2013.01)

(58) Field of Classification Search
CPC ...................................................... H01R 12/79
See application file for complete search history.

(56) References Cited

U.S. PATENT DOCUMENTS 5,906,498 A * 5/1999 Nagafuji ................ H01R 12/79 439/260
7,507,112 B2 * 3/2009 Mundt ............... H01R 13/5829 439/495

(Continued)

FOREIGN PATENT DOCUMENTS

CN 205911462 U 1/2017
JP 2005038701 A 2/2005

(Continued)

*Primary Examiner* — Neil Abrams
(74) *Attorney, Agent, or Firm* — Duane Morris LLP

(57) ABSTRACT

A connector (10) according to the present disclosure includes an insulator (20) including an insertion space portion (21) into and from which a cable (70) including a to-be-locked portion (74) can be inserted and removed, an actuator (50) including a locking portion (51) and supported by the insulator (20) rotatably about a rotation axis (C) between a lock position at which the to-be-locked portion (74) and the locking portion (51) engage with each other when the cable (70) is in an inserted state and an insertion/removal position at which the cable (70) can be inserted into and removed from the insertion space portion (21), and a biasing member (60) supported by the insulator (20) and including an abutting portion (64) that abuts on the actuator (50), the biasing member (60) applying a force to bias the actuator (50) toward the lock position through the abutting portion (64), wherein the locking portion (51), the abutting portion (64), and the rotation axis (C) are positioned apart from one another in an insertion/removal direction in which the cable (70) is inserted into and removed from the insertion space portion (21).

8 Claims, 12 Drawing Sheets

(51) Int. Cl.

| | |
|---|---|
| ***H01R 12/79*** | (2011.01) |
| ***H01R 13/627*** | (2006.01) |
| ***H01R 13/631*** | (2006.01) |

(56) References Cited

U.S. PATENT DOCUMENTS

| | | | | |
|---|---|---|---|---|
| 7,540,764 | B2 * | 6/2009 | Suzuki | H01R 12/79 439/495 |
| 8,292,648 | B2 * | 10/2012 | Kiryu | H01R 12/79 439/495 |
| 8,678,844 | B2 * | 3/2014 | Yoshisuji | H01R 13/641 439/495 |
| 9,525,226 | B2 | 12/2016 | Tamaki | |
| 9,859,639 | B2 | 1/2018 | Tagami et al. | |
| 10,566,721 | B2 * | 2/2020 | Nakajima | H01R 12/89 |
| 10,622,763 | B2 * | 4/2020 | Nakajima | H01R 13/639 |
| 11,043,764 | B2 * | 6/2021 | Takane | H01R 12/79 |
| 11,322,874 | B2 * | 5/2022 | Nagae | H01R 12/88 |
| 11,462,844 | B2 * | 10/2022 | Kajiura | H01R 12/7023 |

FOREIGN PATENT DOCUMENTS

| | | | |
|---|---|---|---|
| JP | 2012204163 | A | 10/2012 |
| JP | 2017162641 | A | 9/2017 |
| JP | 6407070 | B2 | 10/2018 |
| KR | 20130083254 | A | 7/2013 |

* cited by examiner

CONNECTOR AND ELECTRONIC DEVICE

CROSS-REFERENCE TO RELATED APPLICATION

This application claims the benefit of priority of Japanese Patent Application No. 2019-152912 filed Aug. 23, 2019 in Japan, the entire contents of which are incorporated herein by reference.

TECHNICAL FIELD

The present disclosure relates to a connector and an electronic device.

BACKGROUND ART

Hitherto, connectors for use in electronic devices and so on have been demanded to have structures capable of enabling cables to be easily inserted and removed from the viewpoint of improving workability. Because of an increase in complexity of internal assembly in the electronic devices and so on, there is also a demand for a connector with which, for example, when a worker manually inserts and removes a cable in maintenance work of the device, the worker can easily perform the work.

There has been a tendency to miniaturize electronic devices, such as personal computers, for easier portability. With miniaturization of the electronic devices, it is demanded that, even under situations in which a working space inside the electronic device is small, the worker can manually insert and remove the cable in an easy and reliable manner.

For example, Patent Literature (PTL) 1 discloses an electrical connector for a flat conductor in which a movable member automatically returns from an open position to a closed position after removal of the flat conductor.

CITATION LIST

Patent Literature

PTL 1: Japanese Patent No. 6407070

SUMMARY OF INVENTION

According to an embodiment of the present disclosure, there is provided a connector including:

- an insulator including an insertion space portion into and from which a cable including a to-be-locked portion can be inserted and removed;
- an actuator including a locking portion and supported by the insulator rotatably about a rotation axis between a lock position at which the to-be-locked portion and the locking portion engage with each other when the cable is in an inserted state and an insertion/removal position at which the cable can be inserted into and removed from the insertion space portion; and
- a biasing member supported by the insulator and including an abutting portion that abuts on the actuator, the biasing member applying a force to bias the actuator toward the lock position through the abutting portion,
- wherein the locking portion, the abutting portion, and the rotation axis are positioned apart from one another in an insertion/removal direction in which the cable is inserted into and removed from the insertion space portion.

According to an embodiment of the present disclosure, there is provided an electronic device including:

the above-described connector.

DESCRIPTION OF EMBODIMENTS

Figure 1:
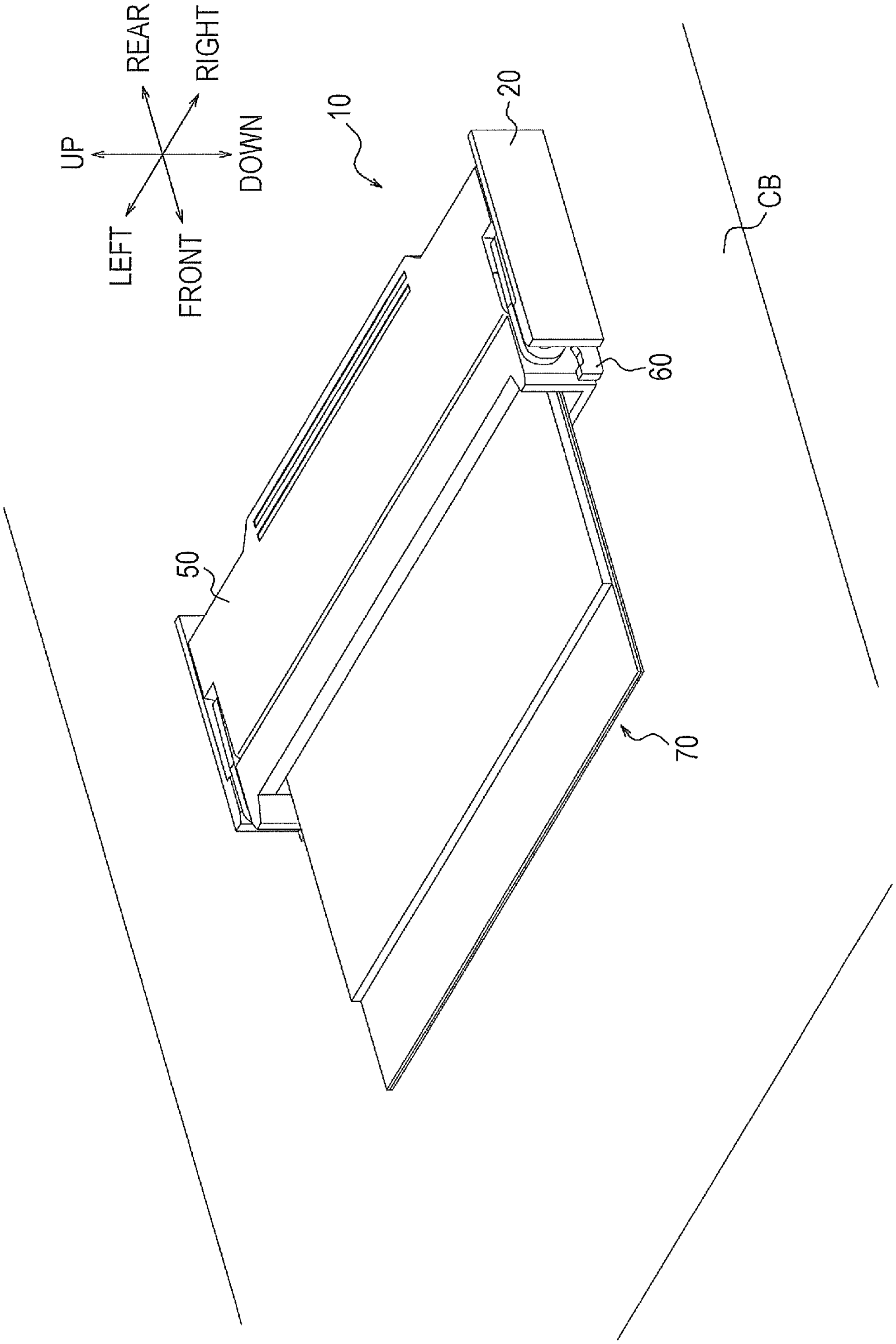
FIG. 1 is an external perspective view, looking from above, of a connector according to an embodiment, the view illustrating a state in which a cable is inserted.

In the electrical connector for the flat conductor disclosed in PTL1, the actuator rotatable between the closed position and the open position with respect to the insulator is rotated toward the open position by, for example, a worker putting a finger on the actuator and raising it upward. Such an operation of opening the actuator needs a working space in which the worker moves and puts the finger on the actuator. Accordingly, the related-art actuator disclosed in PTL 1, for example, is difficult to use in a miniaturized electronic device in which the above-mentioned working space cannot be ensured.

With the connector and the electronic device according to embodiments of the present disclosure, workability in inserting and removing a cable can be improved even in the miniaturized electronic device.

The embodiments of the present disclosure will be described in detail below with reference to the accompanying drawings. In the following description, front and rear directions, left and right directions, and up and down directions are defined on the basis of directions denoted by arrows in the drawings. Among the different drawings, the directions denoted by the corresponding arrows match with one another. In some of the drawings, a circuit board CB, described later, is not illustrated for the sake of simplicity of the drawings.

FIG. 1 is an external perspective view, looking from above, of a connector 10 according to the embodiment, the view illustrating a state in which a cable 70 is inserted. Structures of the connector 10 according to the embodiment and of a cable 70 are mainly described with reference to FIG. 1.

The connector 10 according to the embodiment is mounted on the circuit board CB. The connector 10 electrically connects the cable 70 inserted into the connector 10 and the circuit board CB. The circuit board CB may be a rigid board or any other suitable circuit board.

The cable 70 inserted into the connector 10 is, for example, a flexible printed circuit (FPC) board. However, the cable 70 is not limited to such an example and may be any suitable cable insofar as the cable is electrically connected to the circuit board CB through the connector 10. For example, the cable 70 may be a flexible flat cable (FFC).

The following description is made on an assumption that the cable 70 is inserted into the connector 10 in a direction parallel to the circuit board CB on which the connector 10 is mounted. The cable 70 is inserted into the connector 10 along, for example, a front-rear direction. The cable insertion direction is not limited to such an example, and the cable 70 may be inserted into the connector 10 in a direction orthogonal to the circuit board CB on which the connector 10 is mounted. The cable 70 may be inserted into the connector 10 along an up-down direction.

The wording "insertion/removal direction in which the cable 70 is inserted and removed" used in the following indicates, for example, the front-rear direction. The wording "insertion direction in which the cable 70 is inserted" indicates, for example, a direction from the front toward the rear. The wording "removal direction in which the cable 70 is removed" indicates, for example, a direction from the rear toward the front. The wording "extending direction of a rotation axis C" indicates, for example, the left-right direction. The wording "lengthwise direction of the connector 10" indicates, for example, the left-right direction. The wording "direction orthogonal to both the insertion/removal direction and the extending direction of the rotation axis C" indicates, for example, the up-down direction. The wording "insertion/removal position side of the actuator 50" indicates, for example, an upper side. The wording "side closer to an abutting portion 64 of a biasing member 60" indicates, for example, the upper side. The wording "entrance side of the insertion space portion 21" indicates, for example, a front side. The wording "removal side of the cable 70" indicates, for example, the front side.

Figure 2:
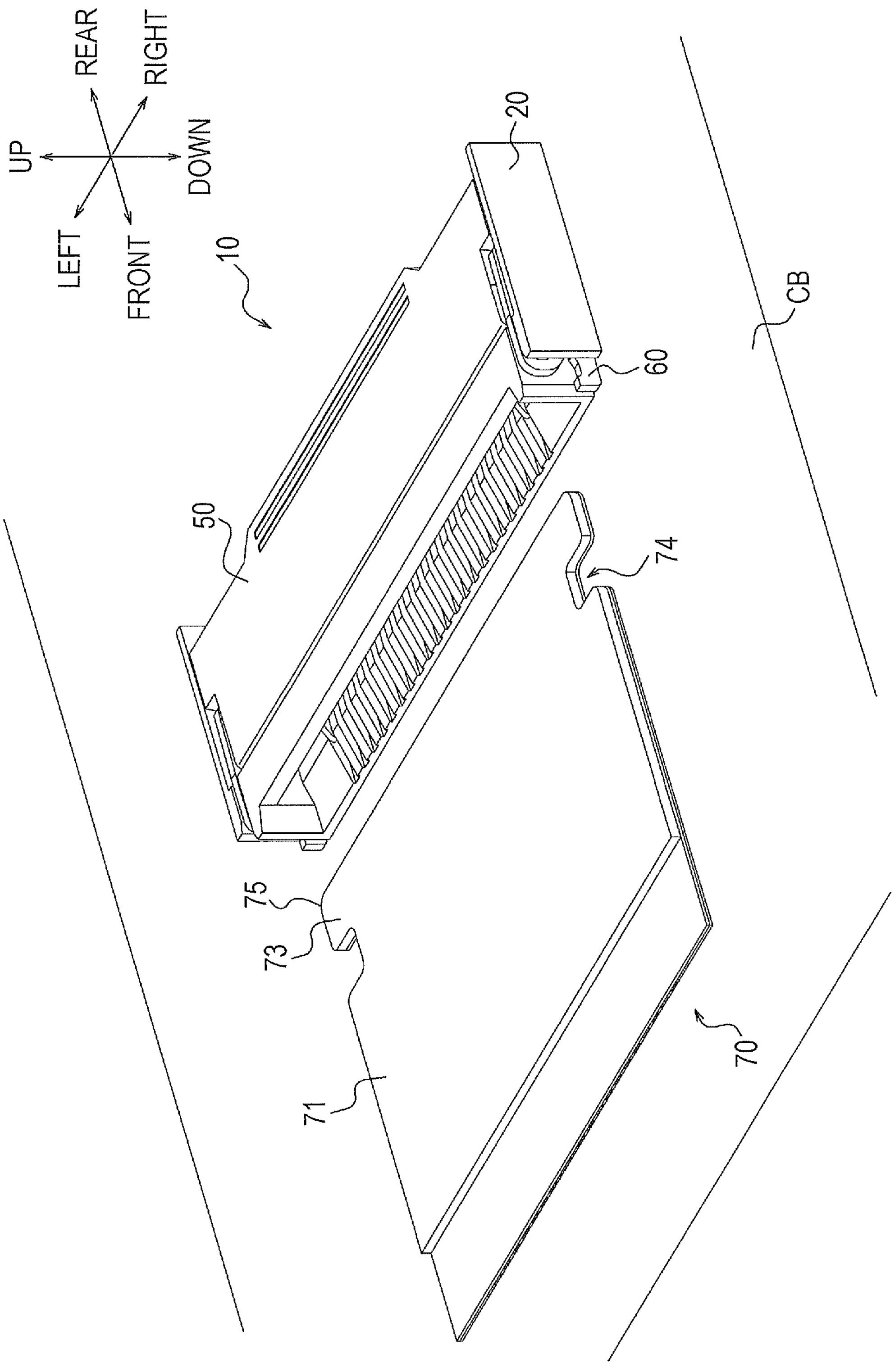
FIG. 2 is an external perspective view, looking from above, of the connector in FIG. 1, the view illustrating a state in which the cable is removed.
Figure 3:
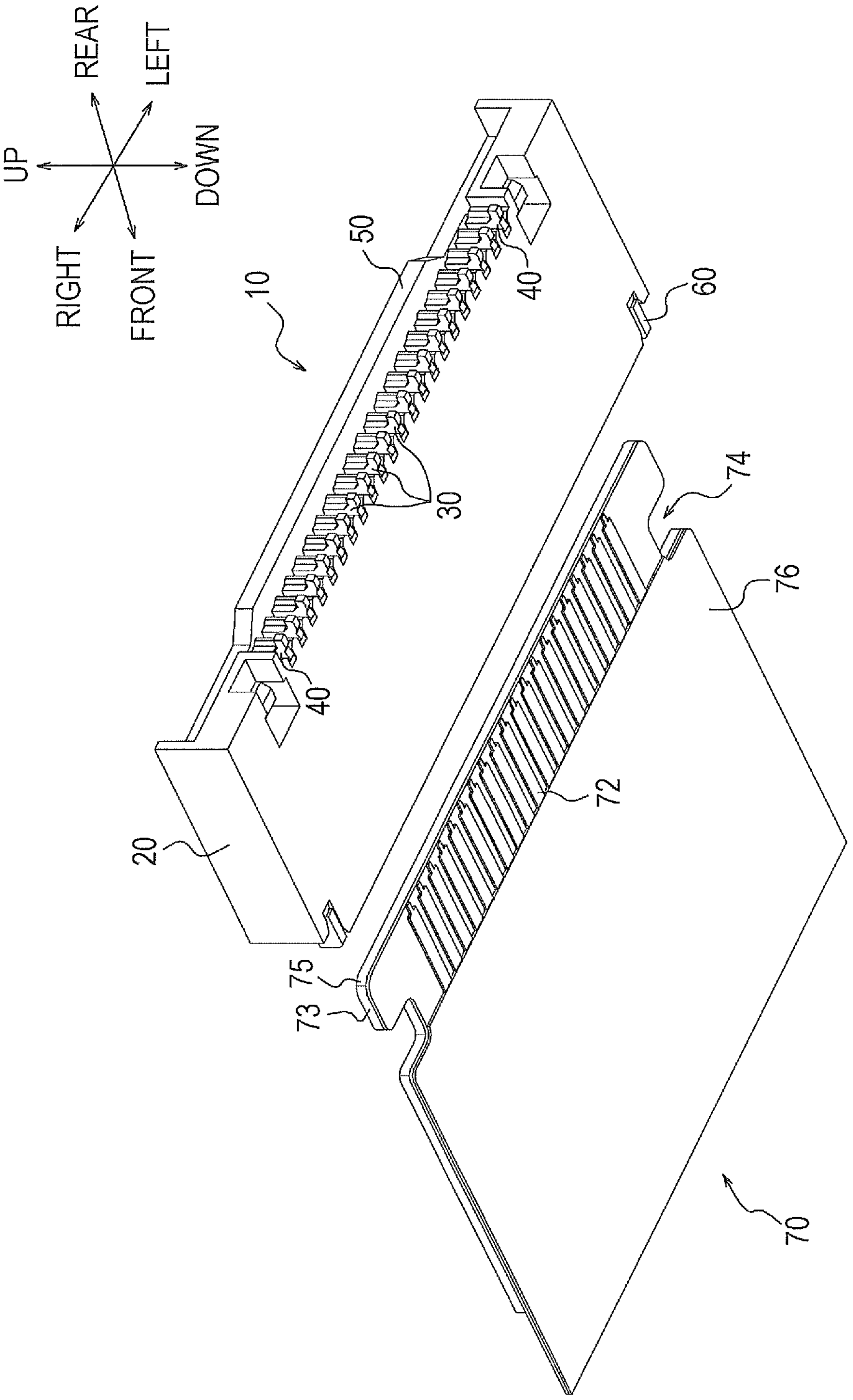
FIG. 3 is an external perspective view, looking from below, of the connector in FIG. 1, the view illustrating the state in which the cable is removed.

FIG. 2 is an external perspective view, looking from above, of the connector 10 in FIG. 1, the view illustrating a state in which the cable 70 is removed. FIG. 3 is an external perspective view, looking from below, of the connector 10 in FIG. 1, the view illustrating the state in which the cable is removed.

Referring to FIGS. 2 and 3, the cable 70 has a multilayer structure including multiple thin film materials bonded to each other. The cable 70 includes a reinforced portion 71 that forms a tip portion in an extending direction of the cable 70, namely in the insertion/removal direction in which the cable 70 is inserted and removed, and that is harder than the other portion. The cable 70 includes multiple signal lines 72 extending linearly along the insertion/removal direction up to a tip end of the reinforced portion 71. The signal lines 72 are covered with an armor of the cable 70 on the removal side of the cable 70 but are exposed downward in the tip portion of the cable 70 on the rear side.

The cable 70 includes holding portions 73 formed on both left and right sides of the reinforced portion 71 in the tip portion of the cable 70 in the insertion direction in which the cable 70 is inserted. The cable 70 includes to-be-locked portions 74 that are positioned adjacent to the holding portions 73 on the removal side and that are formed by cutting both left and right side edges of the reinforced portion 71 toward an inner side of the cable 70. The cable 70 includes guide portions 75 formed in a rounded shape at rear-side corners of the holding portions 73. The cable 70 includes a grounded portion 76 forming a lowermost layer of the armor on the removal side.

Figure 4:
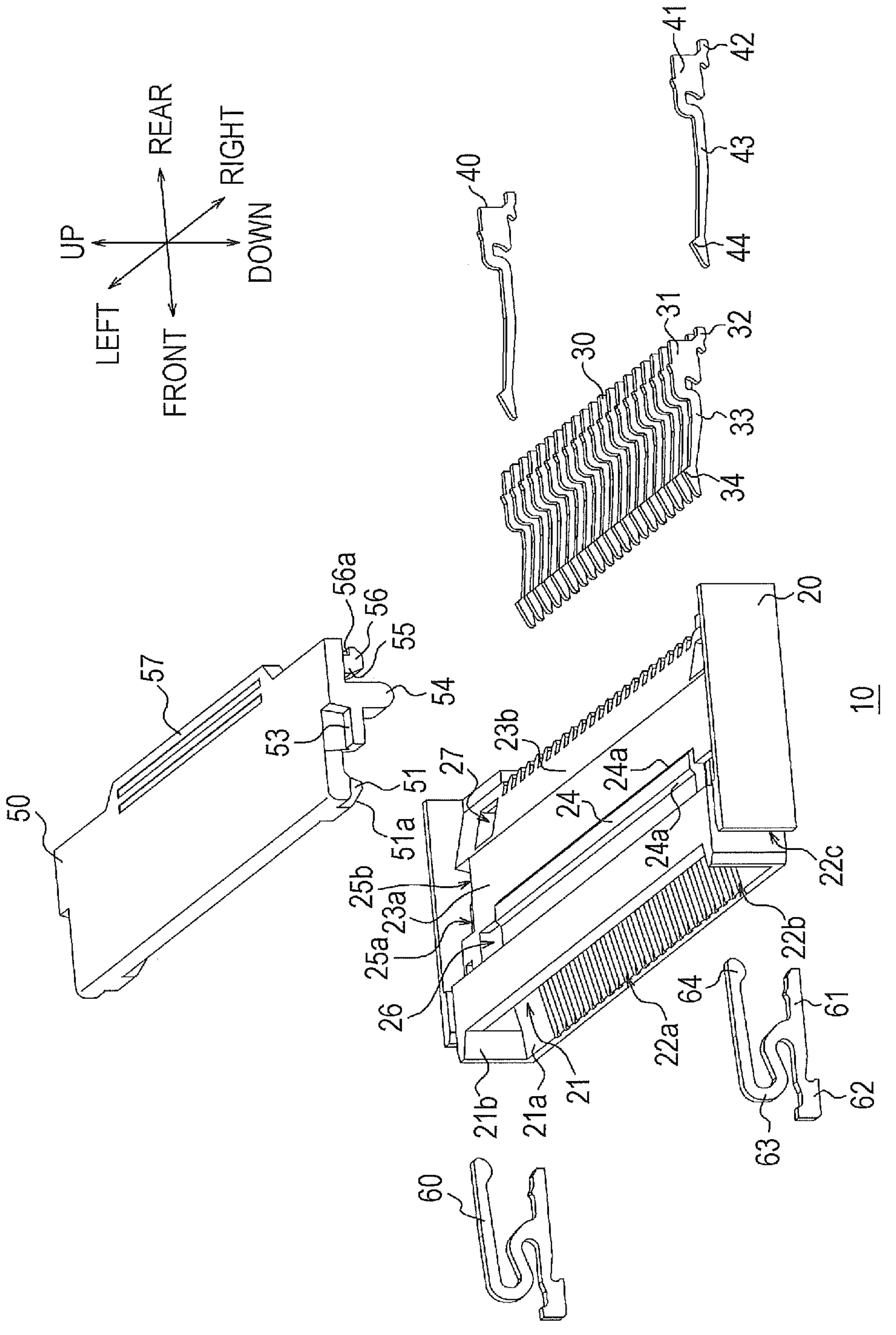
FIG. 4 is an exploded perspective view, looking from above, of the connector in FIG. 1.

FIG. 4 is an exploded perspective view, looking from above, of the connector 10 in FIG. 1. Referring to FIG. 4, the connector 10 according to the embodiment includes, as main components, an insulator 20, first contacts 30, second contacts 40, the actuator 50, and biasing members 60.

The connector 10 is assembled, by way of example, as follows. The first contacts 30 and the second contacts 40 are press-fitted to the inside of the insulator 20 from behind the insulator 20. The actuator 50 is attached to the insulator 20 from above the insulator 20 in a state in which the actuator 50 is inclined downward from the front side toward the rear side relative to the insulator 20. Then, in a state in which the actuator 50 is laid down on the insulator 20, the biasing members 60 are each press-fitted to the inside of the insulator 20 from the front of the insulator 20. At that time, the biasing member 60 comes into contact with the actuator 50 and inhibits the actuator 50 from slipping off upward from the insulator 20. Referring to FIGS. 1 and 2, the connector 10 is mounted on the circuit board CB. The connector 10 electrically connects the cable 70 and the circuit board CB through the first contacts 30 and the second contacts 40.

Figure 5:
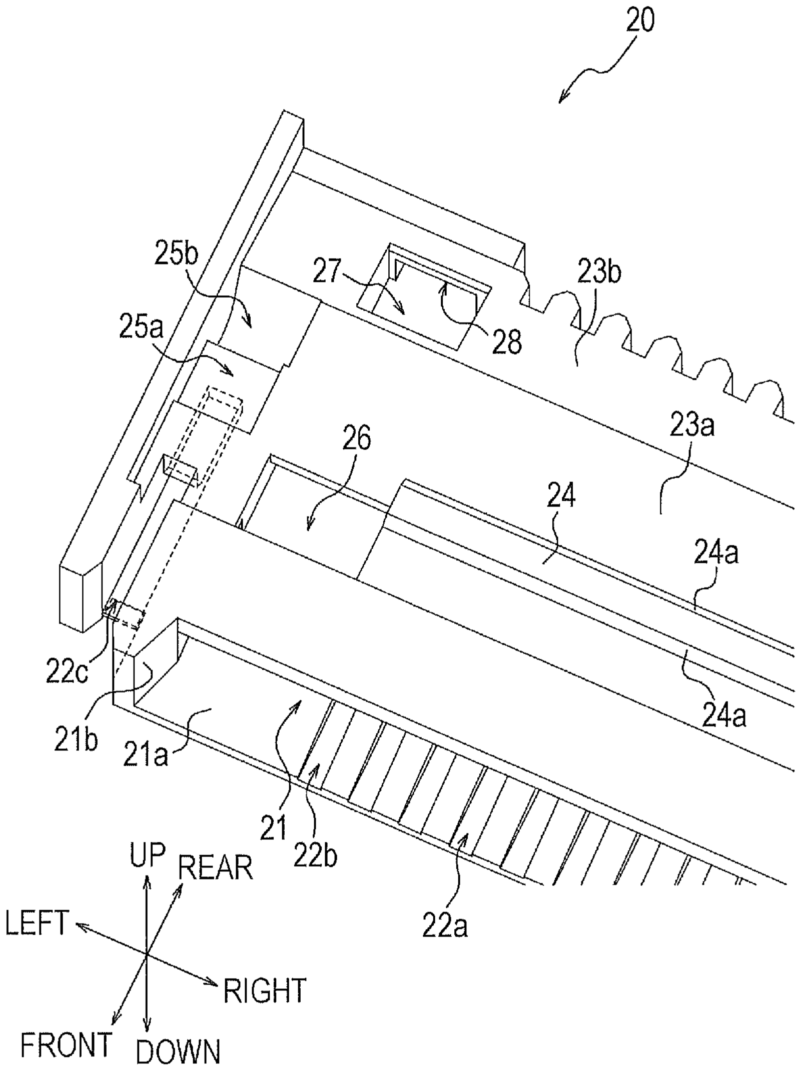
FIG. 5 is an enlarged perspective view, looking from above, of part of an insulator alone in FIG. 4.

FIG. 5 is an enlarged perspective view, looking from above, of part of the insulator 20 alone in FIG. 4. A structure of the insulator 20 will be mainly described with reference to FIGS. 4 and 5.

The insulator 20 is a bilaterally symmetric box-shaped member that is formed by injection molding of an insulating and heat-resistant synthetic resin material. The insulator 20 includes the insertion space portion 21 extending in the lengthwise direction of the connector 10 and formed inside the insulator 20 in a shape recessed in the front-rear direction. The cable 70 is inserted into and removed from the insertion space portion 21. For improving easiness in insertion of the cable 70, the insertion space portion 21 has a slope surface 21*a* formed in a front region of a lower surface of the insertion space portion 21, the slope surface 21*a* sloping toward an inner side of the insertion space portion 21 from the front side toward the rear side. The insertion space portion 21 further has slope surfaces 21*b* formed on the entrance side of the insertion space portion 21 to extend along the insertion direction and to gradually narrow a width of the insertion space portion 21 in the left-right direction.

The insulator 20 includes multiple first attachment grooves 22*a* extending from a rear surface of the insulator 20 up to the entrance side of the insertion space portion 21 in the insertion/removal direction. The first attachment grooves 22*a* are recessed in the lower surface of the insertion space portion 21 over the entire surface in the insertion/removal direction. The first attachment grooves 22*a* are arrayed side by side in the lengthwise direction of the connector 10 apart from each other at a predetermined interval. The first contacts 30 are press-fitted to the first attachment grooves 22*a* in one-to-one relation.

The insulator 20 includes a pair of second attachment grooves 22*b* extending from the rear surface of the insulator 20 up to the entrance side of the insertion space portion 21 in the insertion/removal direction. The second attachment grooves 22*b* are recessed in the lower surface of the insertion space portion 21 over the entire surface in the insertion/removal direction. The pair of second attachment grooves 22*b* are formed to sandwich a group of the first attachment grooves 22*a* in the lengthwise direction of the connector 10 therebetween. The pair of second attachment grooves 22*b* are formed on both the left and right sides of the group of the first attachment grooves 22*a*. The pair of second contacts 40 are press-fitted to the pair of second attachment grooves 22*b* in one-to-one relation.

The insulator 20 includes, at both left and right ends, a pair of third attachment grooves 22*c* extending from a front surface of the insulator 20 up to a substantially central region in the insertion direction. The pair of biasing members 60 are press-fitted to the pair of third attachment grooves 22*c* in one-to-one relation.

The insulator 20 includes a ceiling portion 23*a* formed to cover the insertion space portion 21 from the insertion/removal position side of the actuator 50 in the up-down direction. The insulator 20 has a slope surface 23*b* sloping downward while extending rearward from the ceiling portion 23*a*.

The insulator 20 includes a projection 24 projecting from the ceiling portion 23*a* and extending over a predetermined length along the lengthwise direction of the connector 10. The projection 24 includes a slope portion 24*a* with which a width of the projection 24 in the insertion direction is gradually reduced as a distance from the ceiling portion 23*a* increases in the up-down direction. In more detail, the slope portion 24*a* has a slope surface positioned on a front side of the projection 24 and sloping gradually upward from the front toward the rear, and a slope surface positioned on a rear side of the projection 24 and sloping gradually downward from the front toward the rear.

The insulator 20 includes, at both left and right ends of the ceiling portion 23*a*, first recesses 25*a* recessed one step toward an inner side of the insulator 20. The insulator 20 includes, at both the left and right ends of the ceiling portion 23*a*, second recesses 25*b* on a rear side of the first recesses 25*a*, the second recesses 25*b* being recessed toward the inner side of the insulator 20 another one step from the first recesses 25*a*. The first recesses 25*a* and the second recesses 25*b* are integrally recessed in continuous form.

Figure 12:
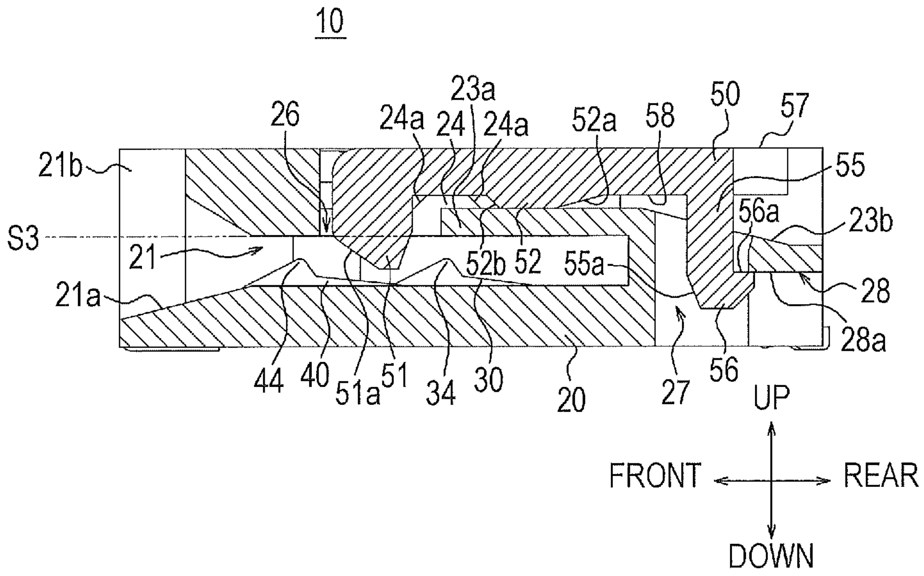
FIG. 12 is a sectional view taken along an arrow line XII-XII in FIG. 8.

The insulator 20 includes, at both left and right sides of the projection 24, first through-holes 26 penetrating through the ceiling portion 23*a* and reaching the inside of the insulator 20. The insulator 20 includes second through-holes 27 penetrating from the slope surface 23*b* up to a back side of the insulator 20 at positions that are substantially the same as those of the first through-holes 26 in the left-right direction but are slightly shifted rearward from the first through-holes 26. The insulator 20 includes an engagement portion 28 formed on a rear side of each of the second through-holes 27 in adjacent to the second through-hole 27. As illustrated in FIG. 12 described later, the engagement portion 28 has an engagement surface 28*a* that is formed substantially horizontally on the rear side of the second through-hole 27 to face downward.

Referring to FIG. 4, the first contact 30 is obtained by forming a thin plate made of, for example, a copper alloy or a Corson-based copper alloy containing phosphoric bronze, beryllium copper, or titanium copper and having spring elasticity into the shape illustrated in FIG. 4 with a progressive die (stamping). The first contact 30 is formed by, for example, only punching. More specifically, the first contact 30 is formed flat in the lengthwise direction of the connector 10. A method of forming the first contact 30 is not limited to the above-mentioned example and may include a step of bending a workpiece in a plate thickness direction after punching. A surface of the first contact 30 is finished by, after forming an underlying layer with nickel plating, coating a surface layer with plating of gold or tin, for example. The multiple first contacts 30 are arrayed side by side in the left-right direction.

The first contact 30 includes a tight-fitting portion 31 tightly fitted to the first attachment groove 22*a* of the insulator 20. The first contact 30 includes a mounting portion 32 extending rearward in a substantially L-shape from a lower end part of the tight-fitting portion 31. The first contact 30 includes an elastic portion 33 that is formed to extend forward continuously from an upper end part of the tight-fitting portion 31 and that is elastically deformable. The elastic portion 33 extends from the upper end part of the tight-fitting portion 31 in a substantially crank-like shape and then inclines obliquely upward toward the front. The first contact 30 further includes a contact portion 34 positioned at a tip end of the elastic portion 33.

The second contact 40 is obtained by forming a thin plate made of, for example, a copper alloy or a Corson-based copper alloy containing phosphoric bronze, beryllium copper, or titanium copper and having spring elasticity into the shape illustrated in FIG. 4 with a progressive die (stamping). The second contact 40 is formed by, for example, only punching. More specifically, the second contact 40 is formed flat in the lengthwise direction of the connector 10. A method of forming the second contact 40 is not limited to the above-mentioned example and may include a step of bending a workpiece in a plate thickness direction after punching. A surface of the second contact 40 is finished by, after forming an underlying layer with nickel plating, coating a surface layer with plating of gold or tin, for example. The pair of second contacts 40 are disposed at both the left and right sides of the group of the first contacts 30.

The second contact 40 includes a tight-fitting portion 41 tightly fitted to the second attachment groove 22*b* of the insulator 20. The second contact 40 includes a mounting portion 42 extending rearward in a substantially L-shape from a lower end part of the tight-fitting portion 41. The second contact 40 includes an elastic portion 43 that is formed to extend forward continuously from an upper end part of the tight-fitting portion 41 and that is elastically deformable. The elastic portion 43 extends from the upper end part of the tight-fitting portion 41 in a substantially crank-like shape and then inclines obliquely upward toward the front. The second contact 40 further includes a contact portion 44 positioned at a tip end of the elastic portion 43.

Figure 6:
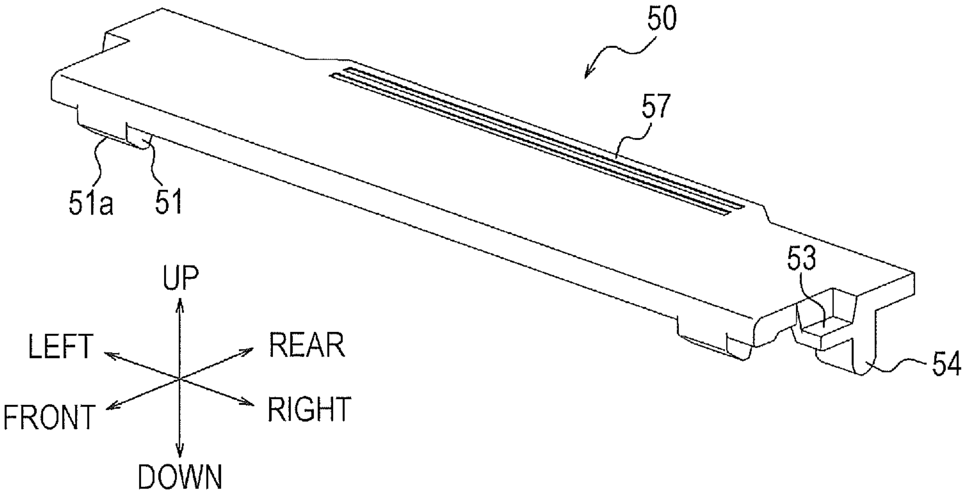
FIG. 6 is an external perspective view, looking from above, of an actuator alone in FIG. 4.
Figure 7:
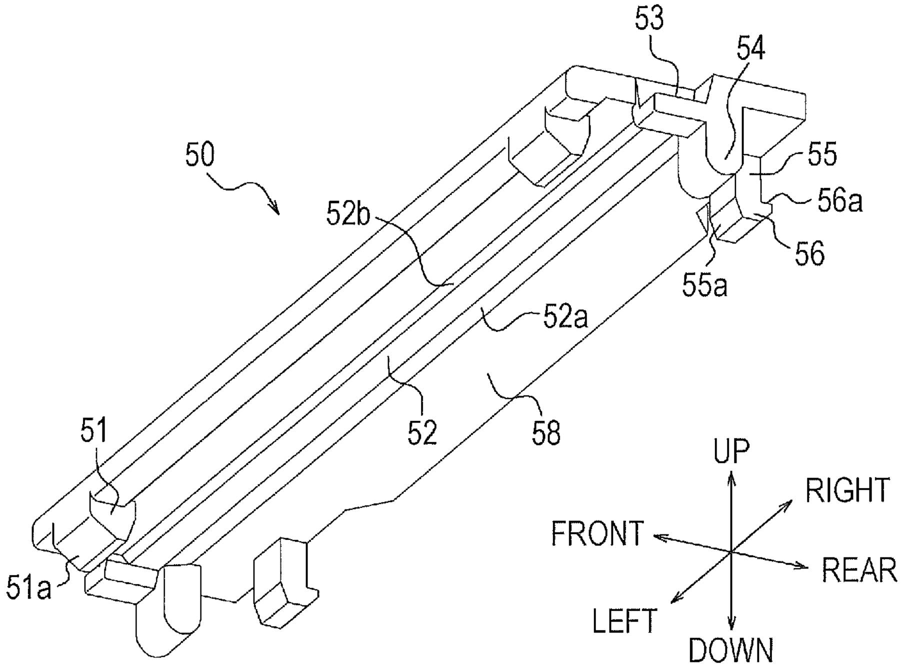
FIG. 7 is an external perspective view, looking from below, of the actuator alone in FIG. 4.

FIG. 6 is an external perspective view, looking from above, of the actuator 50 alone in FIG. 4. FIG. 7 is an external perspective view, looking from below, of the actuator 50 alone in FIG. 4. A structure of the actuator 50 will be mainly described with reference to FIGS. 4, 6 and 7.

The actuator 50 is a bilaterally symmetric plate-shaped member that is formed by injection molding of an insulating and heat-resistant synthetic resin material and that extends in the left-right direction as illustrated in FIGS. 4, 6 and 7. The actuator 50 includes the locking portions 51 projecting downward from both left end right sides of a front end portion. Each of the locking portions 51 has a slope surface 51*a* defining an outer surface of the locking portion on the removal side and sloping gradually downward toward the rear side.

The actuator 50 includes a projection 52 formed in a substantially central portion in the front-rear direction and extending over substantially an entire region in the left-right direction. The projection 52 includes a slope portion 52*a* sloping obliquely upward toward the rear side along the insertion direction. The projection 52 includes a slope portion 52*b* sloping obliquely upward toward the removal side along the removal direction in which the cable 70 is removed. The actuator 50 includes abutting surfaces 53 that are formed in both left and right end portions substantially at the same position as the projection 52 in the front-rear direction. The abutting surfaces 53 are each substantially horizontally formed to face upward at a position lower than an uppermost surface of the actuator 50 by one step.

The actuator 50 includes protruding portions 54 positioned on a rear side of the abutting surfaces 53 and protruding downward. The protruding portions 54 are each formed in a substantially U shape in a sectional view looking in the left-right direction. The actuator 50 includes, in a rear end portion, extending portions 55 extending downward from left and right positions that are located on an inner side than the protruding portions 54 in the left-right direction and that are substantially the same as the left and right positions at which the locking portions 51 are formed. Each of the extending portions 55 has, in a lower end part, a slope surface 55*a* defining an outer surface of the extending portion on the removal side and sloping gradually downward toward the rear side. The actuator 50 includes hook portions 56 formed in the lower end parts of the extending portions 55. Each of the hook portions 56 has an engagement surface 56*a* formed substantially horizontally and facing upward on a rear side of the hook portion 56. The actuator 50 includes an operating portion 57 positioned substantially at a center in a rear edge region of the uppermost surface and extending in the left-right direction.

Referring to FIG. 4, the biasing member 60 is a member obtained by forming a thin plate made of any suitable metal material into the shape illustrated in FIG. 4 with a progressive die (stamping). The biasing member 60 is formed by, for example, only punching that is performed to punch out the metal material in the lengthwise direction of the connector 10. More specifically, the biasing member 60 is formed flat in the lengthwise direction of the connector 10. The biasing member 60 is formed flat to lie in a plane orthogonal to the left-right direction. A method of forming the biasing member 60 is not limited to the above-mentioned example and may include a step of bending a workpiece in a plate thickness direction after punching. The pair of biasing members 60 are disposed at both left and right ends of the connector 10.

The biasing member 60 includes a tight-fitting portion 61 tightly fitted to the third attachment groove 22*c* of the insulator 20. The biasing member 60 includes a mounting portion 62 formed continuously from a front end of the tight-fitting portion 61. The biasing member 60 includes an elastic portion 63 that extends upward in a substantially S-shape from a substantially central region of the tight-fitting portion 61 in the front-rear direction and that is elastically deformable. The biasing member 60 includes an abutting portion 64 positioned at a tip end of the elastic portion 63.

Referring to FIGS. 1 and 2, the connector 10 is mounted to a circuit formation surface formed in an upper surface of the circuit board CB that is disposed substantially parallel to the insertion/removal direction. In more detail, the mounting portion 32 of the first contact 30 is placed on a solder paste applied to a pattern on the circuit board CB. The mounting portion 42 of the second contact 40 and the mounting portion 62 of the biasing member 60 are placed on solder pastes applied to patterns on the circuit board CB. The mounting portion 32, the mounting portion 42, and the mounting portion 62 are soldered to the patterns on the circuit board by heating and melting the solder pastes in a reflow furnace, for example. As a result, mounting of the connector 10 to the circuit board CB is completed.

Figure 8:
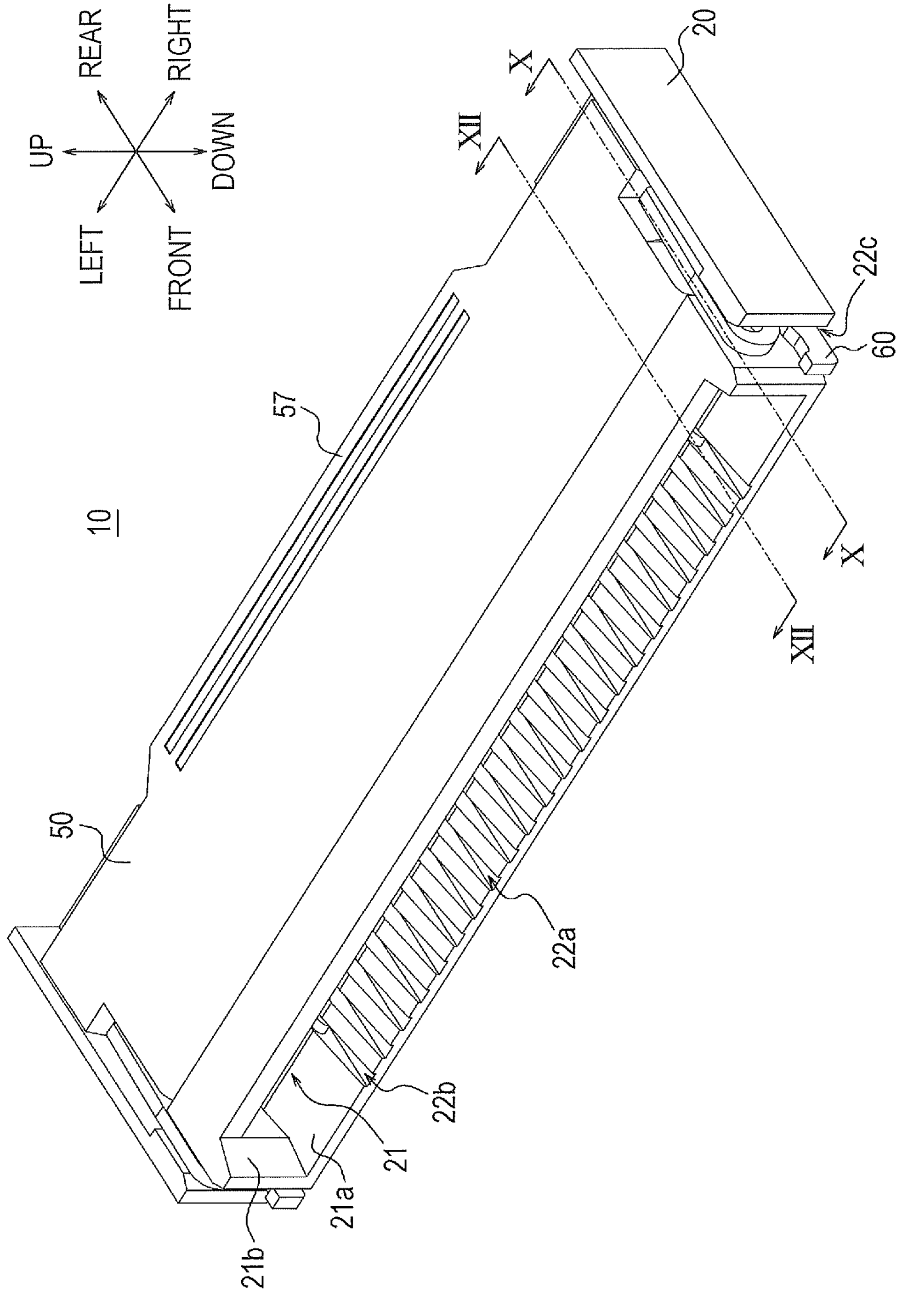
FIG. 8 is an external perspective view, looking from above, of the connector in FIG. 1 when the actuator is in a lock position.
Figure 9:
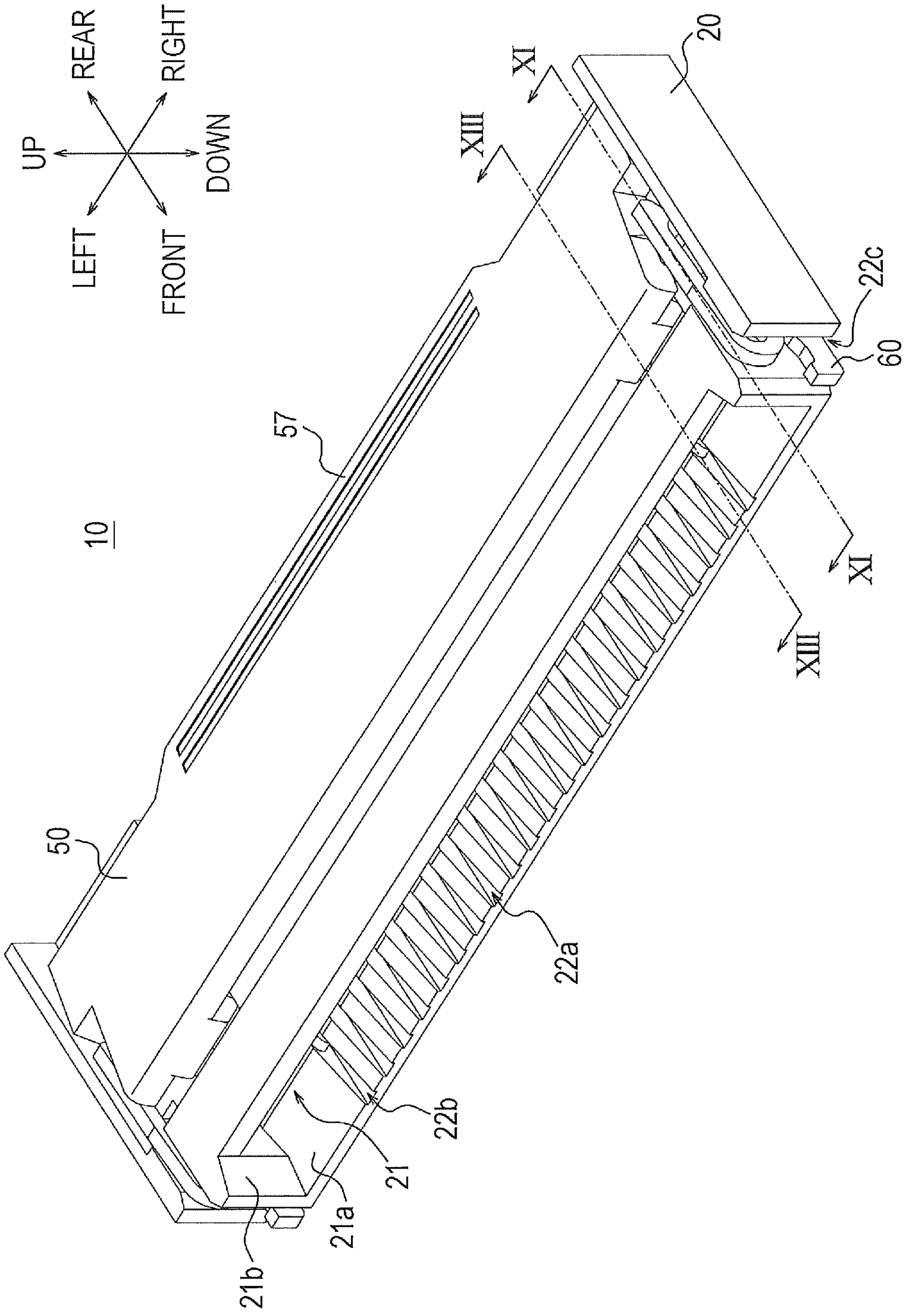
FIG. 9 is an external perspective view, looking from above, of the connector in FIG. 1 when the actuator is in an insertion/removal position.

FIG. 8 is an external perspective view, looking from above, of the connector 10 in FIG. 1 when the actuator 50 is in a lock position. FIG. 9 is an external perspective view, looking from above, of the connector 10 in FIG. 1 when the actuator 50 is in an insertion/removal position. Functions of the connector 10 will be mainly described with reference to FIGS. 8 and 9.

The actuator 50 of the connector 10 is rotatably supported by the insulator 20 about the rotation axis C (described later) between the lock position at which the to-be-locked portions 74 of the cable 70 and the locking portions 51 engage with each other when the cable 70 is in an inserted state and the insertion/removal position at which the cable 70 can be inserted into and removed from the insertion space portion 21. When the actuator 50 is in the lock position, the connector 10 holds the cable 70 inserted in the insertion space portion 21 of the insulator 20. In more detail, the connector 10 inhibits the cable 70 from being removed out of the insertion space portion 21 by causing the locking portion 51 of the actuator 50 and the to-be-locked portion 74 of the cable 70 to engage with each other. When the actuator 50 is in the insertion/removal position, the connector 10 allows the cable 70 to be inserted into and removed from the insertion space portion 21 of the insulator 20. For example, the connector 10 enables the cable 70 to be removed from the insertion space portion 21 by releasing the engagement between the locking portion 51 of the actuator 50 and the to-be-locked portion 74 of the cable 70.

Figure 10:
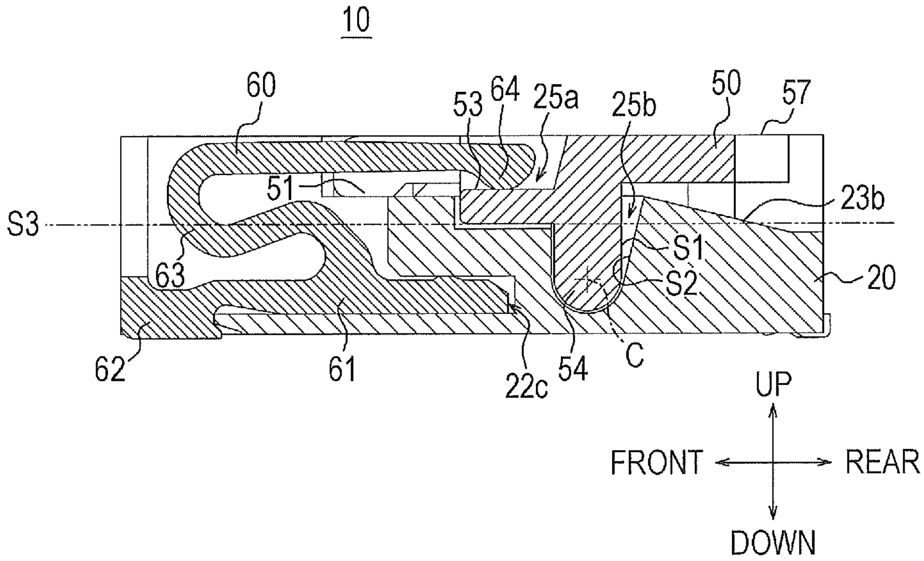
FIG. 10 is a sectional view taken along an arrow line X-X in FIG. 8.
Figure 11:
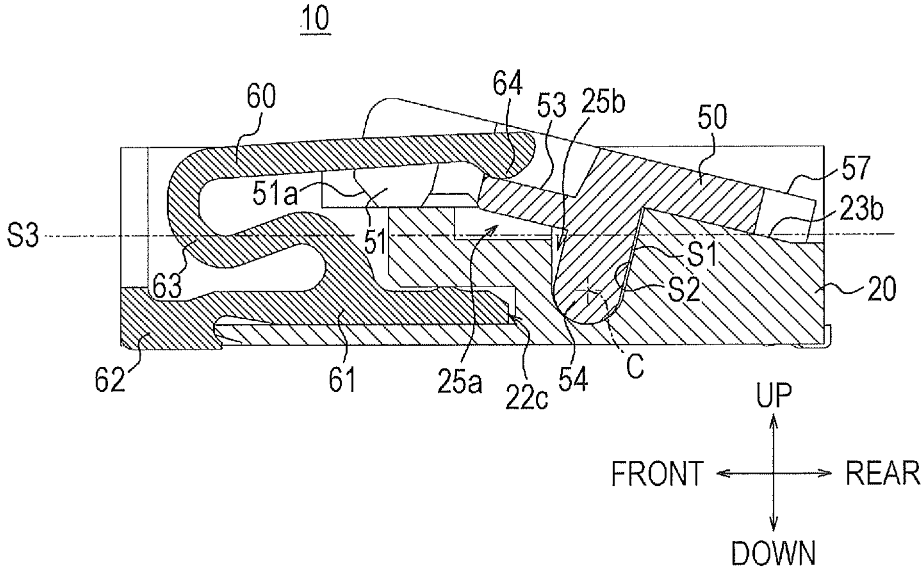
FIG. 11 is a sectional view taken along an arrow line XI-XI in FIG. 9.

FIG. 10 is a sectional view taken along an arrow line X-X in FIG. 8. FIG. 11 is a sectional view taken along an arrow line XI-XI in FIG. 9. Functions of the components included in the insulator 20, the actuator 50, and the biasing member 60 will be mainly described with reference to FIGS. 10 and 11.

When the actuator 50 is attached to the insulator 20, the protruding portion 54 of the actuator 50 protruding toward the insulator 20 in the up-down direction is received and supported to be positioned inside the insulator 20 with the presence of the second recess 25*b* of the insulator 20. At that time, the rotation axis C of the actuator 50, included in the protruding portion 54, is supported in the second recess 25*b* of the insulator 20 from below, whereby the actuator 50 is rotatable about the rotation axis C between the lock position and the insertion/removal position. In the connector 10 according to the embodiment, the actuator 50 is rotated while inclining obliquely downward toward the rear relative to the insulator 20 when the actuator 50 is shifted from the lock position to the insertion/removal position.

The biasing member 60 press-fitted to the insulator 20 contacts the actuator 50 from above. This inhibits the actuator 50 from slipping off upward from the insulator 20. In more detail, the abutting portion 64 of the biasing member 60 contacts the abutting surface 53 formed in the actuator 50 from the insertion/removal position side of the actuator 50. The abutting portion 64 may contact the abutting surface 53 in any suitable contact manner, such as point contact, line contact, or surface contact.

When the actuator 50 is in the lock position, the elastic portion 63 of the biasing member 60 is elastically deformed in the up-down direction. Accordingly, the biasing member 60 applies a downward biasing force to the actuator 50 through the contact between the abutting surface 53 and the abutting portion 64. Similarly, when the actuator 50 is in the insertion/removal position, the elastic portion 63 of the biasing member 60 is elastically deformed in the up-down direction. Accordingly, the biasing member 60 applies a force biasing the actuator 50 toward the lock position through the contact between the abutting surface 53 and the abutting portion 64. Thus, the biasing member 60 always applies the force biasing the actuator 50 toward the lock position through the abutting portion 64 at any positions in a stroke from the lock position to the insertion/removal position.

The locking portion 51 of the actuator 50, the abutting portion 64 of the biasing member 60, and the rotation axis C of the actuator 50 are positioned apart from one another in the insertion/removal direction with respect to the insertion space portion 21 of the insulator 20. For example, the locking portion 51, the abutting portion 64, and the rotation axis C are positioned apart from one another in order from the entrance side of the insertion space portion 21 along the insertion direction from the entrance side toward the inner side of the insertion space portion 21. More specifically, the locking portion 51 of the actuator 50, the abutting portion 64 of the biasing member 60, and the rotation axis C of the actuator 50 are positioned apart from one another along the front-rear direction in order from the front toward the rear.

When the actuator 50 is in the lock position, the abutting portion 64 of the biasing member 60 and the abutting surface 53 of the actuator 50 are positioned inside the insulator 20 in the direction orthogonal to both the insertion/removal direction and the extending direction of the rotation axis C. In such a state, the first recess 25*a* of the insulator 20 receives and supports the abutting portion 64 of the biasing member 60 and the abutting surface 53 of the actuator 50 to be positioned inside the insulator 20.

When the actuator 50 is in the lock position, the slope surface 23*b* of the insulator 20 facing the operating portion 57 of the actuator 50 in the up-down direction provides a gradually increasing distance relative to the operating portion 57 at locations further apart from the entrance side of the insertion space portion 21 in the insertion direction. The operating portion 57 of the actuator 50 is positioned on an opposite side to the abutting portion 64 in the insertion/removal direction with respect to the rotation axis C as a reference and is rotatable between the lock position and the insertion/removal position. When the actuator 50 is in the insertion/removal position, the operating portion 57 of the actuator 50, positioned on the rear side, can be brought into contact with the slope surface 23*b* of the insulator 20 by depressing the operating portion 57 in the up-down direction. With the operating portion 57 of the actuator 50 being depressed, the locking portion 51 of the actuator 50 is raised upward, thus releasing the engagement between the to-be-locked portion 74 of the cable 70 and the locking portion 51 of the actuator 50. As a result, the cable 70 can be removed from the insertion space portion 21 of the insulator 20. When the actuator 50 is in the insertion/removal position, for example, an outer surface S1 of the protruding portion 54 of the actuator 50 and an inner surface S2 of the second recess 25*b* of the insulator 20 may contact each other.

Figure 13:
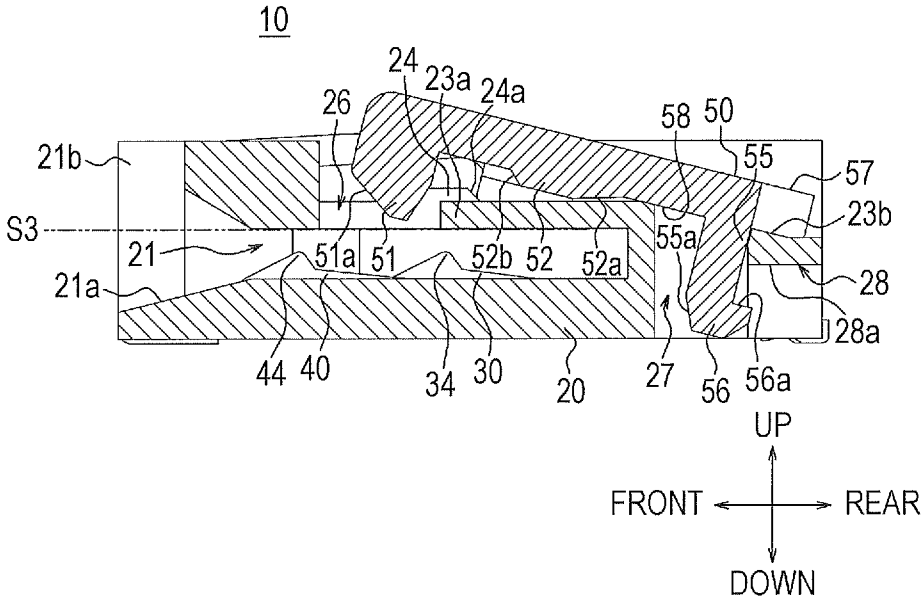
FIG. 13 is a sectional view taken along an arrow line XIII-XIII in FIG. 9.

FIG. 12 is a sectional view taken along an arrow line XII-XII in FIG. 8. FIG. 13 is a sectional view taken along an arrow line XIII-XIII in FIG. 9. Functions of the components included in the insulator 20 and the actuator 50 will be mainly described with reference to FIGS. 12 and 13.

When the actuator 50 is in the lock position, a lower end of the locking portion 51 of the actuator 50 is located inside the insulator 20 at a more inner position than the first through-hole 26 of the insulator 20. A lower end of the extending portion 55 of the actuator 50 is positioned within the second through-hole 27 of the insulator 20.

When the first contact 30 is press-fitted to the first attachment groove 22*a* of the insulator 20, the first contact 30 becomes elastically deformable along the up-down direction. In a free state of the first contact 30 in which the first contact is not elastically deformed, the contact portion 34 protrudes from the first attachment groove 22*a* and is positioned inside the insertion space portion 21. Similarly, when the second contact 40 is press-fitted to the second attachment groove 22*b* of the insulator 20, the second contact 40 becomes elastically deformable along the up-down direction. In a free state of the second contact 40 in which the second contact is not elastically deformed, the contact portion 44 protrudes from the second attachment groove 22*b* and is positioned inside the insertion space portion 21.

An inner surface of the insertion space portion 21 of the insulator 20 defines a reference plane S3 on a side closer to the abutting portion 64 of the biasing member 60, the reference plane S3 facing the cable 70 when the cable 70 is in the inserted state. The reference plane S3 matches with an end surface of the insertion space portion 21 on the insertion/removal position side in the up-down direction. As also illustrated in FIG. 10, for example, the abutting portion 64 of the biasing member 60, the reference plane S3, and the rotation axis C of the actuator 50 are positioned apart from one another in order from the side closer to the abutting portion 64 in the direction orthogonal to both the insertion/removal direction and the extending direction of the rotation axis C.

The extending portion 55 of the actuator 50 extends toward the inner side of the insulator 20 in the direction orthogonal to both the insertion/removal direction and the extending direction of the rotation axis C. The hook portion 56 of the actuator 50 faces the insulator 20 in the above-mentioned orthogonal direction. The hook portion 56 engages with the engagement portion 28 formed in the insulator 20 to inhibit the actuator 50 from slipping out of the insulator 20. In more detail, when the actuator 50 is in the lock position, the engagement surface 56*a* of the hook portion 56 faces toward the insertion/removal position side and engages with the engagement surface 28*a* of the engagement portion 28 of the insulator 20, the engagement surface 28*a* being formed substantially horizontally to face downward in the up-down direction. For example, as also illustrated in FIG. 7, the hook portion 56 is positioned in an opposite side to both the abutting portion 64 of the biasing member 60 and the abutting surface 53 of the actuator 50 in the insertion direction with the protruding portion 54 of the actuator 50 including the rotation axis C interposed therebetween. The rotation axis C is positioned between the hook portion 56 and the abutting portion 64 in the insertion/removal direction.

The projection 52 of the actuator 50 projects from an opposing surface 58 of the actuator 50, the opposing surface 58 being opposed to the ceiling portion 23*a* of the insulator 20. The slope portion 52*a* of the projection 52 provides a gradually decreasing distance relative to the opposing surface 58 toward the extending portion 55 along the insertion direction. The slope portion 52*b* of the projection 52 provides a gradually decreasing distance relative to the opposing surface 58 toward the entrance side of the insertion space portion 21 along the removal direction.

The projection 52 of the actuator 50 and the projection 24 of the insulator 20 are positioned apart from each other in the insertion/removal direction. The projection 24 of the insulator 20 and the operating portion 57 of the actuator 50 are formed at positions sandwiching the projection 52 of the actuator 50 therebetween in the insertion direction. The projection 52 of the actuator 50 is disposed between the operating portion 57 and the projection 24 of the insulator 20 in the insertion/removal direction.

Figure 14:
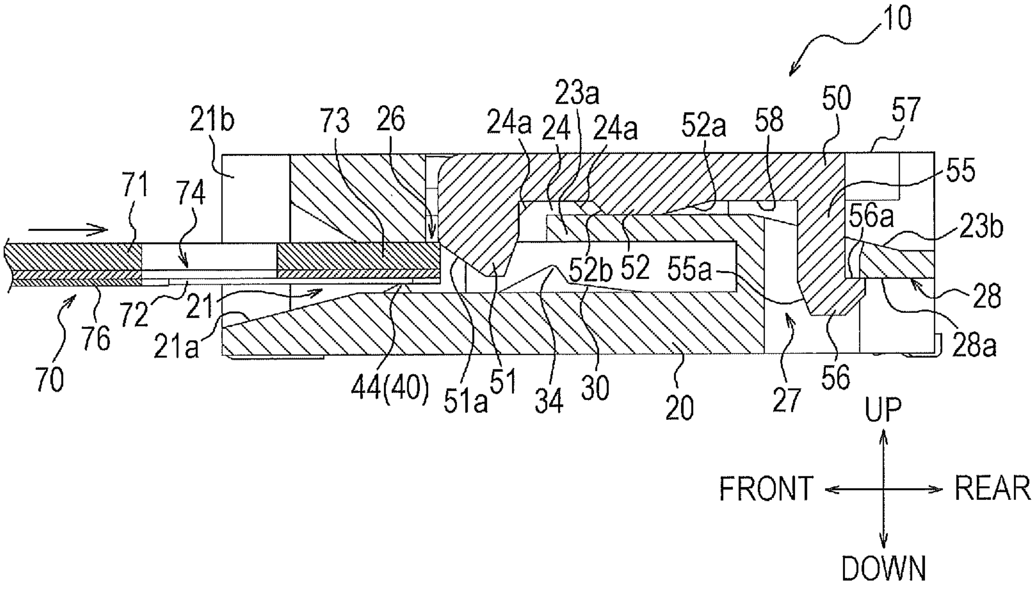
FIG. 14 is a sectional view corresponding to FIG. 12, the view illustrating a situation when the cable is inserted into the connector in FIG. 1.

FIG. 14 is a sectional view corresponding to FIG. 12, the view illustrating a situation when the cable 70 is inserted into the connector 10 in FIG. 1. Functions of the components when the cable 70 is inserted into the connector 10 will be mainly described with reference to FIG. 14.

When the cable 70 is inserted into the connector 10, for example, a tip of the reinforced portion 71 of the cable 70 enters the insertion space portion 21 along the slope surface 21*a* that is formed in the front region of the lower surface of the insertion space portion 21. At that time, even if an inserted position of the cable 70 is slightly deviated downward relative to the insertion space portion 21, the tip of the reinforced portion 71 slides over the slope surface 21*a* of the insertion space portion 21, whereby the cable 70 is guided into the inside of the insertion space portion 21. Similarly, even if the inserted position of the cable 70 is slightly deviated in the left-right direction relative to the insertion space portion 21, the guide portion 75 of the cable 70 slides over the slope surface 21*b* of the insertion space portion 21, whereby the cable 70 is guided into the inside of the insertion space portion 21.

When the cable 70 is further moved toward the inner side of the insertion space portion 21, the holding portion 73 of the cable 70 comes into contact with the locking portion 51 of the actuator 50. At that time, a drag force acting toward the insertion/removal position of the actuator 50 is generated due to the contact between the locking portion 51 and the cable 70 at the slope surface 51*a* of the locking portion 51 on the removal side. Accordingly, the moment of a force acting toward the insertion/removal position is generated on the actuator 50. When the cable 70 is still further moved toward the inner side of the insertion space portion 21 in the state in which the locking portion 51 and the holding portion 73 are in contact with each other, the actuator 50 is rotated toward the insertion/removal position due to the moment of the force acting toward the insertion/removal position. When the actuator 50 is rotated toward the insertion/removal position, an amount of elastic deformation of the elastic portion 63 of the biasing member 60 is further increased, and hence the force applied from the abutting portion 64 of the biasing member 60 to bias the abutting surface 53 of the actuator 50 toward the lock position is further increased. At that time, the locking portion 51 of the actuator 50 rides over an upper surface of the holding portion 73 of the cable 70 once. With further movement of the cable 70 toward the rear side, the holding portion 73 slides relative to a tip end of the locking portion 51.

Figure 15:
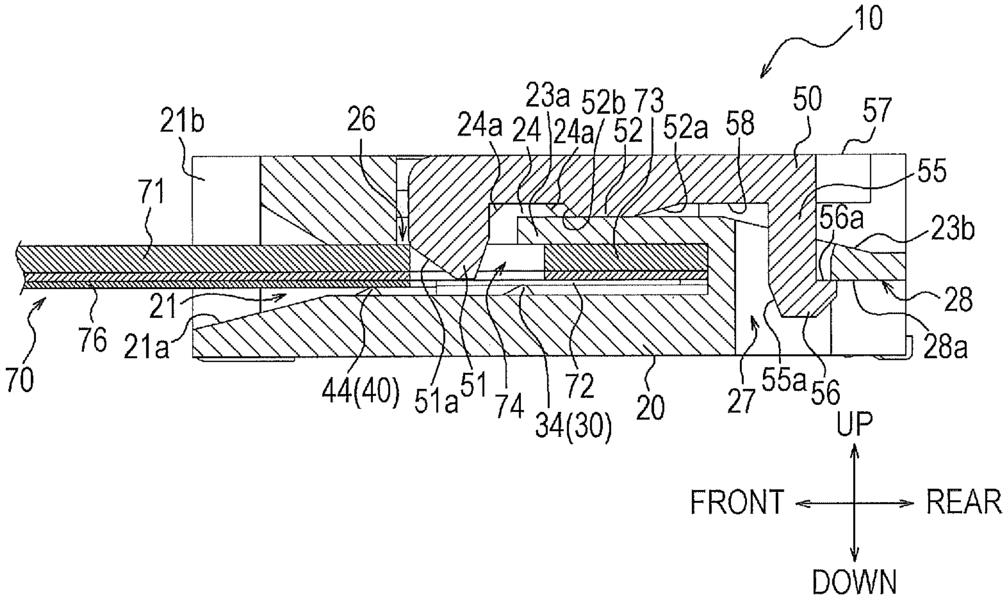
FIG. 15 is a sectional view corresponding to FIG. 12, the view illustrating a situation when the cable has been inserted into the connector in FIG. 1.

FIG. 15 is a sectional view corresponding to FIG. 12, the view illustrating a situation when the cable 70 has been inserted into the connector 10 in FIG. 1. Functions of the components in the situation when the cable 70 has been inserted into the connector 10 will be mainly described with reference to FIG. 15.

When the cable 70 is in the inserted state, the ceiling portion 23*a* of the insulator 20 faces the cable 70 from the side closer to the abutting portion 64. When the cable 70 is completely inserted into the insertion space portion 21, the holding portion 73 of the cable 70 passes over the locking portion 51 of the actuator 50 and is received inside the insertion space portion 21. On that occasion, the locking portion 51 and the holding portion 73 come into a non-contact state in the up-down direction, and the actuator 50 is automatically rotated to the lock position by the biasing force applied from the biasing member 60. In the lock position of the actuator 50, the locking portion 51 engages with the to-be-locked portion 74 of the cable 70. As a result, the actuator 50 holds the cable 70 inserted in the insertion space portion 21 and prevents removal of the cable 70. Even if the cable 70 is forced to be removed in the above-mentioned state, the holding portion 73 of the cable 70 contacts the locking portion 51. Hence the cable 70 is more effectively held in place and prevented from being removed.

Thus, with only one operation of inserting the cable 70, the connector 10 holds the cable 70 and prevents removal of the cable 70 without needing any operation on the actuator 50 by a worker or with an assembly device, for example.

When the cable 70 is completely inserted into the insertion space portion 21, a lower surface of the signal line 72 of the cable 70 contacts the contact portion 34 of the first contact 30, thereby causing the first contact 30 to be elastically deformed into the inner side of the first attachment groove 22*a*. Similarly, a lower surface of the grounded portion 76 of the cable 70 contacts the contact portion 44 of the second contact 40, thereby causing the second contact 40 to be elastically deformed into the inner side of the second attachment groove 22*b*. As a result, the circuit board CB on which the connector 10 is mounted and the cable 70 are electrically connected to each other through the first contact 30 and the second contact 40. With the contact between the contact portion 44 and grounded portion 76, the cable 70 is grounded to the circuit board CB through the connector 10. Thus, since the grounded portion 76 is formed at a position different from the signal line 72 and is grounded to the circuit board CB, noise is reduced even in high-speed transmission.

Figure 16:
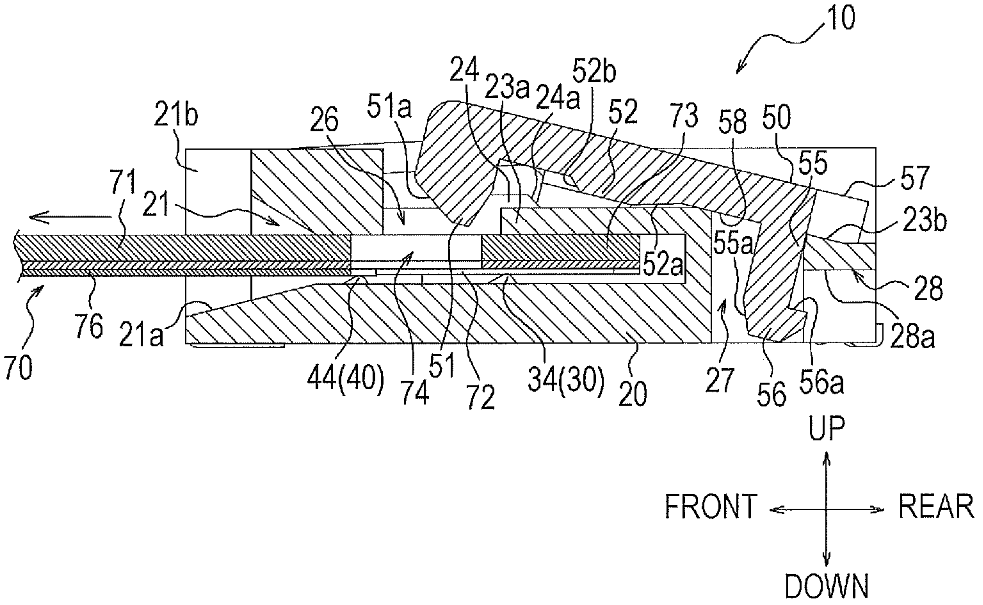
FIG. 16 is a sectional view corresponding to FIG. 13, the view illustrating a situation when the cable is removed from the connector in FIG. 1.

FIG. 16 is a sectional view corresponding to FIG. 13, the view illustrating a situation when the cable 70 is removed from the connector 10 in FIG. 1. Functions of the components in the situation when the cable 70 is removed from the connector 10 will be mainly described with reference to FIG. 16.

When the connector 10 is in the state in which the cable 70 is completely inserted into the insertion space portion 21, the worker or the assembly device, for example, operates the operating portion 57 of the actuator 50, thus rotating the actuator 50 to the insertion/removal position. More specifically, the worker or the assembly device, for example, moves the operating portion 57 downward by depressing it along the up-down direction. As a result, the locking portion 51 of the actuator 50, positioned on the opposite side to the operating portion 57 in the insertion direction, is raised upward, whereby the engagement between the to-be-locked portion 74 of the cable 70 and the locking portion 51 of the actuator 50 is released.

The worker or the assembly device, for example, removes the cable 70, inserted in the insertion space portion 21, in the removal direction while maintaining the depressing of the operating portion 57 of the actuator 50. After removing the cable 70, the worker or the assembly device, for example, stops the depressing of the operating portion 57 of the actuator 50. During the above operation, the biasing member 60 continues to bias the actuator 50 toward the lock position through the contact between the abutting portion 64 and the abutting surface 53 of the actuator 50 due to the elastic deformation of the elastic portion 63. Accordingly, the actuator 50 is rotated about the rotation axis C by the biasing force applied from the biasing member 60 and is automatically returned to the lock position.

With the above-described connector 10 according to the embodiment, workability in inserting and removing the cable 70 can be improved even in a miniaturized electronic device. For example, the connector 10 includes the biasing member 60 that applies the force biasing the actuator 50 toward the lock position through the abutting portion 64 held in abutment on the actuator 50, and the locking portion 51 that comes into contact with the cable 70 inserted into the insertion space portion 21, thus causing the actuator 50 to be rotated toward the insertion/removal position side. Therefore, with only one operation of inserting the cable 70, the connector 10 can realize stable holding of the cable 70 and reliable prevention of removal of the cable 70 without needing any operation on the actuator 50 by the worker or with the assembly device, for example. As a result, the connector 10 can improve the workability in inserting the cable 70 even in the miniaturized electronic device.

With the connector 10, since the locking portion 51, the abutting portion 64, and the rotation axis C are positioned apart from one another in the insertion/removal direction with respect to the insertion space portion 21, the actuator 50 can be operated to incline downward toward the rear. Therefore, the worker or the assembly device, for example, can remove the cable 70 by depressing the operating portion 57 of the actuator 50. A working space necessary for work of depressing the operating portion 57 of the actuator 50 is smaller than that necessary for work of raising the actuator. Accordingly, unlike the related-art connector in which the worker puts the finger on the actuator and raises it upward, the connector 10 according to the embodiment can improve the workability in removing the cable 70 even in the miniaturized electronic device.

Since the locking portion 51, the abutting portion 64, and the rotation axis C are positioned apart from one another and the rotation axis C is located at the rearmost position, an amount of movement of the locking portion 51 in the up-down direction when the actuator 50 is rotated from the lock position toward the insertion/removal position is greater than that when they are disposed substantially at the same position along the front-rear direction. As a result, the amount of movement of the locking portion 51 in the up-down direction with which the above-described operation of the actuator 50 for inserting and removing the cable 70 can be realized is ensured even when the connector 10 is miniaturized and an amount of depressing of the actuator 50 is reduced. Hence the connector 10 can maintain the workability in inserting and removing the cable 70 even when the connector is miniaturized.

Since the abutting portion 64 and the abutting surface 53 are positioned inside the insulator 20 when the actuator 50 is in the lock position, the height of the connector 10 is reduced. Accordingly, convenience of the connector 10 is improved even in application to the miniaturized electronic device.

Since the insulator 20 includes the first recess 25*a* receiving and supporting the abutting portion 64 and the abutting surface 53 to be positioned inside the insulator 20, the abutting portion 64 and the abutting surface 53 are not exposed to the outside from an upper surface of the insulator 20. Accordingly, during assembly of an electronic device, for example, it is possible to suppress not only contact between the biasing member 60 and another component used in the electronic device during the assembly of the electronic device, but also adhesion of foreign matters to the abutting portion 64 and the abutting surface 53. Therefore, deformation or damage of the biasing member 60 can be suppressed. As a result, reliability of the connector 10 as a product is improved.

The rotation of the actuator 50 is allowed due to the structure that the second recess 25*b* of the insulator 20 receives and supports the protruding portion 54 including the rotation axis C to be positioned inside the insulator 20. With that structure, damage of the actuator 50 can be suppressed unlike a related-art connector in which a rotation shaft of an actuator is supported by metal contacts or other metal fittings. More specifically, since the protruding portion 54 including the rotation axis C of the actuator 50 contacts the insulator 20 made of resin instead of a metal member, shaving or deformation of the actuator 50 caused by friction attributable to the rotation is suppressed.

Since the outer surface S1 of the actuator 50 and the inner surface S2 of the insulator 20 contact each other when the actuator 50 is in the insertion/removal position, stability of the actuator 50 in the insertion/removal position is improved in comparison with the case in which only the operating portion 57 contacts the insulator 20.

Since the biasing member 60 is formed flat in the lengthwise direction of the connector 10, a width of the connector 10 in the lengthwise direction can be reduced. Hence a mounting area of the connector 10 to the circuit board CB can be reduced.

Since the rotation axis C is positioned on an opposite side to the insertion/removal position with the reference plane S3 interposed therebetween, the moment of a force acting to rotate the actuator 50 toward the lock position is more apt to generate when the actuator 50 is in the lock position. Accordingly, even when the actuator 50 is biased toward the lock position by a small biasing force, a possibility of the cable 70 being unintentionally removed from the insulator 20 is effectively suppressed.

Since the abutting portion 64, the reference plane S3, and the rotation axis C are positioned apart from one another in order from the insertion/removal position side in the up-down direction, the amount of movement of the locking portion 51 in the up-down direction when the actuator 50 is rotated from the lock position toward the insertion/removal position is greater than that when they are disposed substantially at the same position along the up-down direction. As a result, the amount of movement of the locking portion 51 in the up-down direction with which the above-described operation of the actuator 50 for inserting and removing the cable 70 can be realized is ensured even when the connector 10 is miniaturized and the amount of depressing of the actuator 50 is reduced. Hence the connector 10 can maintain the workability in inserting and removing the cable 70 even when the connector 50 is miniaturized.

Since the actuator 50 includes the operating portion 57 coming into contact with the insulator 20 and releasing the engagement between the cable 70 and the locking portion 51 when the operating portion 57 is depressed, the actuator 50 is inhibited from opening excessively. For example, in the related-art connector in which the worker puts the finger on the actuator and raises it upward, there is a possibility that the actuator may be rotated excessively beyond a correct insertion/removal position. With the connector 10 according to the embodiment, the insulator 20 can inhibit the actuator 50 from opening excessively. As a result, the connector 10 can inhibit the actuator 50 from slipping out of the insulator 20 due to the excessive opening, and can suppress, for example, damages of the insulator 20 and the actuator 50, which may be caused in the event of the slipping-out of the actuator 50. In addition, since the worker or the assembly device, for example, can remove the cable 70 just by depressing the operating portion 57, the operating portion 57 is easy to operate. Hence operability in performing the operation by the worker or with the assembly device, for example, is improved.

Since the biasing member 60 includes the elastic portion 63 that extends in the substantially S-shape and that is elastically deformable, the width of the connector 10 in the insertion/removal direction can be reduced. Accordingly, the mounting area of the connector 10 to the circuit board CB can be reduced.

With the above-described connector 10 according to the embodiment, damage attributable to the operation of rotating the actuator 50 can be suppressed even in the miniaturized electronic device. With the connector 10, it is easy to rotate the actuator 50 because, as described above, the rotation axis C is positioned on the rear side of the abutting portion 64 such that the amount of movement of the locking portion 51 in the up-down direction when the actuator 50 is rotated from the lock position toward the insertion/removal position is increased. The extending portion 55 and the hook portion 56 of the actuator 50 engage with the engagement portion 28 of the insulator 20, whereby the actuator 50 is inhibited from slipping out of the insulator 20 even if the operating portion 57 is lifted upward. As a result, the damage attributable to the operation of rotating the actuator 50 and the slipping-off the actuator 50 from the insulator 20 are effectively inhibited.

With the connector 10, not only the biasing member 60 inhibits the slipping-off of the actuator 50, but also the hook portion 56 inhibits the slipping-off of the actuator 50 from the insulator 20. Accordingly, the biasing member 60 does not need to be formed so thick in the lengthwise direction of the connector 10 beyond a necessary level with intent to inhibit the slipping-off of the actuator 50 from the insulator 20. Hence the thickness of the biasing member 60 in the lengthwise direction of the connector 10 can be reduced, and the width of the connector 10 in the lengthwise direction can also be reduced. As a result, the mounting area of the connector 10 to the circuit board CB can be reduced.

Since the actuator 50 includes the projection 52 projecting from the opposing surface 58, the strength of the actuator 50 is increased. Accordingly, even when the connector 10 is miniaturized, the damage of the actuator 50 is less likely to occur, and the reliability of the connector 10 as a product is improved.

Since the projection 52 has the slope portion **52*a*, the damages of the insulator 20 and the actuator 50 are suppressed when the actuator 50 is shifted to the insertion/removal position. For example, as illustrated in FIG. 13, when the actuator 50 is in the insertion/removal position, the surface of the slope portion 52*a* and the upper surface of the ceiling portion 23*a* are substantially parallel to each other. Accordingly, although the slope portion 52*a* and the ceiling portion 23*a* contact each other when the actuator 50 is in the insertion/removal position, both the portions contact each other between their facing surfaces. Hence a force caused by the contact between the actuator 50 and the insulator 20 is distributed, and the damages of the insulator 20 and the actuator 50** are suppressed.

Since the insulator 20 includes the projection 24 projecting from the ceiling portion **23*a*, the strength of the insulator 20 is increased. Accordingly, even when the connector 10 is miniaturized, the damage of the insulator 20 is less likely to occur, and the reliability of the connector 10** as a product is improved.

Since the projection 52 of the actuator 50 and the projection 24 of the insulator 20 are formed apart from each other in the insertion direction, the height of the connector 10 is reduced in comparison with that when both the projections are formed substantially at the same position in the insertion direction. Accordingly, the size of the connector 10 is reduced.

Since the projection 24 of the insulator 20 is formed apart from the operating portion 57 and the projection 52 of the actuator 50 in the removal direction, the contact between the projection 24 of the insulator 20 and the actuator 50 is suppressed even when the actuator 50 is in the insertion/removal position. Hence the damage of the projection 24 of the insulator 20 caused by the contact with the actuator 50 is suppressed.

Since the insulator 20 has the slope surface **23*b*, the actuator 50 is inhibited from rotating excessively toward the insertion/removal position side. When the actuator 50 is rotated toward the insertion/removal position side, the operating portion 57 of the actuator 50 comes into contact with the slope surface 23*b*, whereby the insertion/removal position of the actuator 50 is determined and further rotation of the actuator 50** is inhibited.

Since the hook portion 56 has the engagement surface **56*a* engaging with the engagement portion 28, the actuator 50 is inhibited from slipping off upward from the insulator 20 even when an unintentional external force is applied to the actuator 50 in the lock position. More specifically, even when the actuator 50 is caused to move in the direction slipping out of the insulator 20 by the unintentional external force, upward movement of the actuator 50 is inhibited due to the engagement between the engagement surface 56*a* of the hook portion 56 and the engagement surface 28*a* of the engagement portion 28. Accordingly, the reliability of the connector 10** as a product is improved.

Since the extending portion 55 has the slope surface **55*a*, the contact between the extending portion 55 and the insulator 20 is sufficiently suppressed even when the actuator 50** is in the insertion/removal position.

It is apparent to those skilled in the art that the present disclosure can also be implemented in other specific forms other than the above-described embodiments without departing from the spirit or the substantial features of the present disclosure. Thus, the above description is merely illustrative, and the present disclosure is not limited to the above description. The scope of the present disclosure is defined in attached Claims instead of the foregoing description. Among all kinds of modifications, some modifications falling within the ranges of equivalent concepts are to be interpreted as being included in the scope of the present disclosure.

For example, the shapes, layouts, orientations, numbers, and so on of the above-described components are not limited to those described above and illustrated in the drawings. The shapes, layouts, orientations, numbers, and so on of the components may be optionally adopted or selected insofar as the intended functions of the components can be realized.

A method of assembling the above-described connector 10 is not limited to the above-described one. The method of assembling the connector 10 may be optionally selected insofar as the method can assemble the components to be able to obtain the intended functions. For example, the first contact 30, the second contact 40, and the biasing member 60 may be molded integrally with the insulator 20 by insert molding instead of press-fitting.

For example, even when the actuator 50 is in the lock position, the abutting portion 64 and the abutting surface 53 may be positioned outside the insulator 20 in the direction orthogonal to the insertion direction.

For example, even when the actuator 50 is in the insertion/removal position, the outer surface S1 of the actuator 50 does not always need to contact the inner surface S2 of the insulator 20.

For example, the actuator 50 does not always need to include the operating portion 57 for releasing the engagement between the cable 70 and the locking portion 51. The connector 10 may be a connector in which, once the cable 70 is inserted, the cable 70 is maintained in the inserted state without being removed.

For example, the actuator 50 does not always need to include the projection 52 projecting from the opposing surface 58 of the actuator 50, the opposing surface 58 being opposed to the ceiling portion 23*a*.

For example, the projection 52 may be formed in any suitable sectional shape without including the slope portion 52*a*.

For example, the insulator 20 does not always need to include the projection 24 projecting from the ceiling portion 23*a*.

For example, the projection 24 may be formed in any suitable sectional shape without including the slope portion 24*a*.

For example, the projection 52 of the actuator 50 and the projection 24 of the insulator 20 may be formed at the same position along the insertion direction.

For example, the insulator 20 may determine the insertion/removal position of the actuator 50 with the aid of a surface having any suitable shape instead of the slope surface 23*b* that is formed as a flat surface. For example, the slope surface 23*b* of the insulator 20 may be formed as a curved surface.

The hook portion 56 may have, instead of the engagement surface 56*a* formed as a horizontal surface facing the insertion/removal position side, an engagement surface that acts to increase firmness of the engagement between the hook portion 56 and the engagement portion 28. For example, the engagement surface 56*a* of the hook portion 56 and the engagement surface 28*a* of the engagement portion 28 may be slope surfaces sloping obliquely upward toward the rear side from the removal side.

The extending portion 55 may have a surface in any suitable shape instead of the slope surface 55*a* that is formed as a flat surface. For example, the extending portion 55 may have a curved surface in a rounded shape.

The above-described connector 10 is mounted on electronic devices. The electronic devices include, for example, any suitable information devices such as a personal computer, a copying machine, a printer, a facsimile, and a multifunction device. The electronic devices include any suitable audiovisual devices such as a liquid crystal television, a recorder, a camera, and a headphone. The electronic devices include, for example, any suitable on-vehicle devices such as a camera, a radar, a drive recorder, and an engine control unit. The electronic devices include, for example, any suitable on-vehicle devices for use in on-vehicle systems such as a car navigation system, an advanced driver assistance system, and a security system. In addition, the electronic devices include any suitable industrial equipment.

In respect of those electronic devices, since workability is improved by using the above-described connector 10, assembly work of the electronic devices is effectively performed even when the electronic devices are miniaturized. Hence manufacturing of the electronic devices is facilitated.

REFERENCE SIGNS LIST

10 connector
20 insulator
21 insertion space portion
21*a* slope surface
21*b* slope surface
22*a* first attachment groove
22*b* second attachment groove
22*c* third attachment groove
23*a* ceiling portion
23*b* slope surface
24 projection (second projection)
24*a* slope portion (second slope portion)
25*a* first recess
25*b* second recess
26 first through-hole
27 second through-hole
28 engagement portion
28*a* engagement surface
30 first contact
31 tight-fitting portion
32 mounting portion
33 elastic portion
34 contact portion
40 second contact
41 tight-fitting portion
42 mounting portion
43 elastic portion
44 contact portion
50 actuator
51 locking portion
51*a* slope surface
52 projection (first projection)
52*a* slope portion (first slope portion)
52*b* slope portion
53 abutting surface
54 protruding portion
55 extending portion
55*a* slope surface
56 hook portion
56*a* engagement surface
57 operating portion
58 opposing surface
60 biasing member
61 tight-fitting portion
62 mounting portion
63 elastic portion
64 abutting portion
70 cable
71 reinforced portion
72 signal line
73 holding portion
74 to-be-locked portion
75 guide portion
76 grounded portion C rotation axis
CB circuit board
S1 outer surface
S2 inner surface
S3 reference plane

The invention claimed is:

1. A connector comprising:

an insulator including an insertion space portion into and from which a cable including a to-be-locked portion can be inserted and removed;

an actuator including a locking portion and supported by the insulator rotatably about a rotation axis between a lock position at which the to-be-locked portion and the locking portion engage with each other when the cable is in an inserted state and an insertion/removal position at which the cable can be inserted into and removed from the insertion space portion; and a biasing member supported by the insulator and including an abutting portion that abuts on the actuator, the biasing member applying a force to bias the actuator toward the lock position through the abutting portion, wherein the locking portion, the abutting portion, and the rotation axis are positioned apart from one another in an insertion/removal direction in which the cable is inserted into and removed from the insertion space portion, wherein the locking portion, the abutting portion, and the rotation axis are disposed in order in an insertion direction in which the cable is inserted into the insertion space portion, and wherein the actuator has an abutting surface that abuts on the abutting portion, and the abutting portion and the abutting surface are positioned inside the insulator in a direction orthogonal to both the insertion/removal direction and an extending direction of the rotation axis when the actuator is in the lock position.

2. The connector according to claim 1, wherein the insulator includes a first recess receiving the abutting portion and the abutting surface to be positioned inside the insulator in the orthogonal direction.

3. The connector according to claim 1, wherein the actuator includes a protruding portion including the rotation axis and protruding in a direction orthogonal to both the insertion/removal direction and an extending direction of the rotation axis, and the insulator includes a second recess receiving the protruding portion to be positioned inside the insulator in the orthogonal direction.

4. The connector according to claim 3, wherein an outer surface of the protruding portion and an inner surface of the second recess contact each other when the actuator is in the insertion/removal position.

5. The connector according to claim 1, wherein the biasing member is formed flat along a plane orthogonal to an extending direction of the rotation axis.

6. The connector according to claim 1, wherein an inner surface of the insertion space portion defines a reference plane on a side closer to the abutting portion, the reference plane facing the cable when the cable is in the inserted state, and the abutting portion, the reference plane, and the rotation axis are disposed in order from the side closer to the abutting portion in a direction orthogonal to both the insertion/removal direction and an extending direction of the rotation axis.

7. The connector according to claim 1, wherein the actuator includes an operating portion that is positioned on an opposite side to the abutting portion in the insertion/removal direction with respect to the rotation axis as a reference and that is rotatable between the lock position and the insertion/removal position.

8. An electronic device including the connector according to claim 1.

* * * * *